(12) United States Patent
Wang et al.

(10) Patent No.: US 11,243,453 B2
(45) Date of Patent: Feb. 8, 2022

(54) MOBILE TERMINAL

(71) Applicant: GUANGDONG OPPO MOBILE TELECOMMUNICATIONS CORP., LTD., Guangdong (CN)

(72) Inventors: Qiang Wang, Guangdong (CN); Lisi Xu, Guangdong (CN); Biao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/890,248

(22) Filed: Jun. 2, 2020

(65) Prior Publication Data
US 2020/0393740 A1 Dec. 17, 2020

(30) Foreign Application Priority Data
Jun. 12, 2019 (CN) .......................... 201920881910.3

(51) Int. Cl.
*G03B 11/04* (2021.01)
*H04M 1/02* (2006.01)

(52) U.S. Cl.
CPC .......... *G03B 11/045* (2013.01); *H04M 1/0262* (2013.01); *H04M 1/0264* (2013.01)

(58) Field of Classification Search
CPC ........................... G03B 11/045; H04M 1/0264
(Continued)

(56) References Cited

U.S. PATENT DOCUMENTS 10,116,845 B2 * 10/2018 Hiramatsu ........... H04N 5/2253
10,728,503 B1 * 7/2020 Fu ........................... G08B 3/10
(Continued)

FOREIGN PATENT DOCUMENTS

CN 203261364 10/2013
CN 106027706 10/2016
(Continued)

OTHER PUBLICATIONS

ISA/CN, International Search Report in PCT App. No. PCT/CN2020/095677, dated Sep. 2, 2020, 10 pages.
(Continued)

*Primary Examiner* — Christopher E Mahoney
(74) *Attorney, Agent, or Firm* — Hodgson Russ LLP

(57) ABSTRACT

The present disclosure provides a mobile terminal, including: one or more camera components located inside the mobile terminal, wherein each of the camera components comprises a lens having a circular viewing angle, the camera component has a field of view, and the field of view is within the circular viewing angle; and a sheet that covers the camera component, wherein the sheet comprises a light-transmitting region and a light-shielding region, the light-shielding region surrounds the light-transmitting region, and the field of view intersects with the sheet to form intersections located in the light-transmitting region; the light-transmitting region comprises edge contour lines comprising first straight line segments and first arc line segments connected to each other, the first straight line segments are located in a circle in which the first arc line segments are located, and first straight line segments are partially or entirely located in the circular viewing angle.

5 Claims, 14 Drawing Sheets

(58) Field of Classification Search
USPC .......................................................... 396/534
See application file for complete search history.

(56) References Cited

U.S. PATENT DOCUMENTS

| | | | | |
|---|---|---|---|---|
| 2006/0007551 | A1* | 1/2006 | Sakurai | G02B 27/0018 |
| | | | | 359/611 |
| 2011/0038065 | A1 | 2/2011 | Miyawaki et al. | |
| 2011/0319131 | A1 | 12/2011 | An et al. | |
| 2018/0107093 | A1* | 4/2018 | Chalenko | G02B 5/005 |
| 2018/0246329 | A1* | 8/2018 | Bamberger | G06T 3/40 |
| 2019/0335027 | A1* | 10/2019 | Cheng | H04M 1/0264 |
| 2019/0335028 | A1* | 10/2019 | Cheng | G06F 1/1686 |
| 2020/0170363 | A1* | 6/2020 | Shannon, III | G03B 11/045 |

FOREIGN PATENT DOCUMENTS

| | | |
|---|---|---|
| CN | 106161897 | 11/2016 |
| CN | 206332711 | 7/2017 |
| CN | 206339769 | 7/2017 |
| CN | 108140647 | 6/2018 |
| CN | 108519657 | 9/2018 |
| CN | 108600465 | 9/2018 |
| CN | 109040570 | 12/2018 |
| CN | 109462675 | 3/2019 |
| CN | 208956096 | 6/2019 |
| CN | 210093262 | 2/2020 |

OTHER PUBLICATIONS

EPO, Extended European Search Report for EP Application No. 20179594.5, dated Nov. 10, 2020.

EPO, Communication for EP Application No. 20179594.5, dated Jun. 4, 2021.

IPI, Office Action for IN Application No. 202014024442, dated Jul. 12, 2021.

* cited by examiner

MOBILE TERMINAL

CROSS REFERENCE TO RELATED APPLICATION(S)

This application claims priority to Chinese Patent Application No. 201920881910.3, filed Jun. 12, 2019, the entire disclosure of which is incorporated herein by reference.

TECHNICAL FIELD

Embodiments of the present disclosure generally relate to mobile terminal technologies.

BACKGROUND

In existing mobile terminals, a transparent region of the cover sheet that covers the camera is simple, generally square or round.

SUMMARY

According to a first aspect of the present disclosure, a mobile terminal is provided that solves a technical problem with existing mobile terminals that the shape of the transparent region of the cover sheet that covers the camera is simple.

A mobile terminal according to an embodiment the present disclosure can include:

one or more camera components located inside the mobile terminal, where each of the camera components includes a lens having a circular viewing angle, the camera component having a field of view, and the field of view being within the circular viewing angle; and a sheet that covers the camera component, where the sheet includes a light-transmitting region and a light-shielding region, the light-shielding region surrounds the light-transmitting region, and the field of view intersects with the sheet to form intersections located in the light-transmitting region; the light-transmitting region includes edge contour lines including first straight line segments and first arc line segments connected to each other, the first straight line segments are located in a circle in which the first arc line segments are located, and first straight line segments are partially or entirely located in the circular viewing angle.

According to an exemplary embodiment, the camera component includes a sensor which has a square viewing angle, and a portion where the circular viewing angle and the square viewing angle overlap forms the field of view.

According to an exemplary embodiment, the number of the first straight line segments is two, and the two first straight line segments are oppositely arranged; the number of the first arc line segments is two, and the two first arc segments are oppositely arranged; the first straight segments and the first arc segments are connected alternately.

According to an exemplary embodiment, the intersections form a square structure with four corners being curved, and the intersections include two second straight line segments, two third straight line segments, and four second arc segments, the two second straight line segments are oppositely arranged, the two third straight line segments are oppositely arranged, and each of the second arc segments is connected between one of second straight line segments and one of the third straight line segments which are adjacent to each other.

According to an exemplary embodiment, the intersections are located inside a region surrounded by the edge contour lines, the second straight line segments are parallel to the first straight line segments, and the second arc segments are parallel to the first arc segments; or, the second straight line segments overlap with the first straight line segments, and the second arc segments overlap with the first arc segments.

According to an exemplary embodiment, the intersections form a square structure, and the intersections include two second straight line segments and two third straight line segments, the two second straight line segments are oppositely arranged, the two third straight line segments are oppositely arranged, and the second straight line segments and the third straight line segments are adjacently arranged.

According to an exemplary embodiment, the intersections are located inside a region surrounded by the edge contour lines, and the second straight line segments are parallel to the first straight line segments; or, the intersections are located in a region surrounded by the edge contour lines, and the second straight line segments overlap with the first straight line segments.

According to an exemplary embodiment, the number of the camera components is n, n is greater than or equal to 1, and the n camera components are arranged along a length direction of the mobile terminal, and the first straight line segments are provided along the length direction of the mobile terminal; or the n camera components are arranged along the width direction of the mobile terminal, and the first straight line segments are provided along the width direction of the mobile terminal.

According to an exemplary embodiment, the mobile terminal further includes a battery cover and a decorative ring, where a through slot is formed on the battery cover, and the decorative ring passes through the through slot and is fixed in the through slot, and the sheet is fixed in the decorative ring.

According to an exemplary embodiment, the mobile terminal further includes a battery cover, a part of the battery cover forms the sheet.

In the mobile terminal according to embodiments of the present disclosure, the edge contour lines of the light-transmitting region of the sheet may not be a traditional circle or square shape. Instead, a combination of a circle and a square can be used to obtain edge contour lines including first straight line segments and first arc line segments. The first straight line segments can be partially or entirely within a circular viewing angle, and all ambient light within the field of view of the camera component can enter the camera component through the light-transmitting region. The area of the light-transmitting region can be reduced while the light-transmitting region can meet the field of view of the camera component, and the size of the decorative ring and the size of the sheet as well as the through slot can be reduced. As a result, the strength of the battery cover may be increased, and the physical form of the mobile terminal can be changed to improve the aesthetics of the product.

According to a second aspect of the present disclosure, a mobile terminal is provided that solves a technical problem with the existing mobile terminals that the shape of the transparent region of the cover sheet that covers the camera is simple.

A mobile terminal according to an embodiment of the present disclosure include:

one or more camera components located inside the mobile terminal, where each of the camera components includes a lens and a sensor, the lens has a circular viewing angle, the sensor has a square viewing angle, and all or part of the square viewing angle is within the circular viewing angle; and a sheet that covers the camera component, where the sheet includes a light-transmitting region and a light-shielding region, the light-shielding region surrounds the light-transmitting region, the light-transmitting region includes edge contour lines including first straight line segments and first arc line segments connected to each other, the first straight line segments are located in a circle in which the first arc line segments are located, the square viewing angle is entirely within the light-transmitting region, a part of the circular viewing angle is within the light-transmitting region, and the other part of the circular viewing angle is outside the light-transmitting region.

According to an exemplary embodiment, a portion where the circular viewing angle and the square viewing angle overlap forms the field of view of the camera component, and the field of view intersects with the sheet to form intersections located in the light-transmitting region.

According to an exemplary embodiment, the number of the first straight line segments is two, and the two first straight line segments are oppositely arranged; the number of the first arc line segments is two, and the two first arc segments are oppositely arranged; the first straight segments and the first arc segments are connected alternately.

According to an exemplary embodiment, the intersections form a square structure with four corners being curved, and the intersections include two second straight line segments, two third straight line segments, and four second arc segments, the two second straight line segments are oppositely arranged, the two third straight line segments are oppositely arranged, and each of the second arc segments is connected between one of second straight line segments and one of the third straight line segments which are adjacent to each other.

According to an exemplary embodiment, the intersections are located inside a region surrounded by the edge contour lines, the second straight line segments are parallel to the first straight line segments, and the second arc segments are parallel to the first arc segments; or, the second straight line segments overlap with the first straight line segments, and the second arc segments overlap with the first arc segments.

According to an exemplary embodiment, the intersections form a square structure, and the intersections includes two second straight line segments and two third straight line segments, the two second straight line segments are oppositely arranged, the two third straight line segments are oppositely arranged, and the second straight line segments and the third straight line segments are adjacently arranged.

According to an exemplary embodiment, the intersections are located inside a region surrounded by the edge contour lines, and the second straight line segments are parallel to the first straight line segments; or, the intersections are located in a region surrounded by the edge contour lines, and the second straight line segments overlap with the first straight line segments.

The mobile terminal according to embodiments of the present disclosure includes a sheet and a camera component. The edge contour lines of the light-transmitting region of the sheet may not be a traditional circle or square shape. Instead, a combination of a circle and a square can be used to obtain edge contour lines including first straight line segments and first arc line segments. The sheet covers the camera component, all of the square viewing angle formed by the sensor is within the light-transmitting region, a part of the circular viewing angle is within the light-transmitting region, and the other part of the circular viewing angle is outside the light-transmitting region. The area of the light-transmitting region can be reduced while the light-transmitting region can meet the capture requirements of the camera component, and the size of the decorative ring and the size of the sheet as well as the through slot can be reduced. As a result, the strength of the battery cover may be increased, and the physical form of the mobile terminal can be changed to improve aesthetics of the product.

BRIEF DESCRIPTION OF THE DRAWINGS

In order to explain the technical solutions in the embodiments of the present disclosure or related arts more clearly, the drawings used in the description of the embodiments or the related arts will be briefly introduced below. Obviously, the drawings in the following description are merely some exemplary embodiments of the present disclosure. For those of ordinary skill in the art, other drawings can be obtained according to these drawings without paying creative labor.

DETAILED DESCRIPTION

In order to facilitate understanding of the present disclosure, the present disclosure will be described more fully with reference to the drawings. The drawings show exemplary embodiments of the present disclosure. However, embodiments of the present disclosure can be implemented in many different forms and are not limited to the embodiments described herein. Rather, these embodiments are provided to provide a thorough and comprehensive understanding of the present disclosure.

The term "terminal device" herein includes, but is not limited to, a device configured for receiving and/or transmitting communication signals which can be communicated in any one or more of the following connection methods:

(1) connections using wired lines, such as Public Switched Telephone Networks (PSTN), Digital Subscriber Line (DSL), digital cable, direct cable connection;

(2) connections via a wireless interface, such as a cellular network, a wireless local area network (WLAN), a digital television network such as a DVB-H network, a satellite network, and an AM-FM broadcast transmitter.

A terminal device configured to communicate through a wireless interface may be referred to as a "mobile terminal". Examples of mobile terminals include, but are not limited to, the following electronic devices:

(1) satellite phone or cellular phone;

(2) personal Communications System (PCS) terminals which incorporate combine cellular radiotelephones with data processing, facsimile, and data communication capabilities;

(3) radiotelephone, pager, Internet/Intranet access device, Web browser, memo pad, calendar, Personal Digital Assistant (PDA) equipped with a Global Positioning System (GPS) receiver;

(4) conventional laptop and/or handheld receivers;

(5) conventional laptop and/or handheld radiotelephone transceivers, etc.

Figure 1:
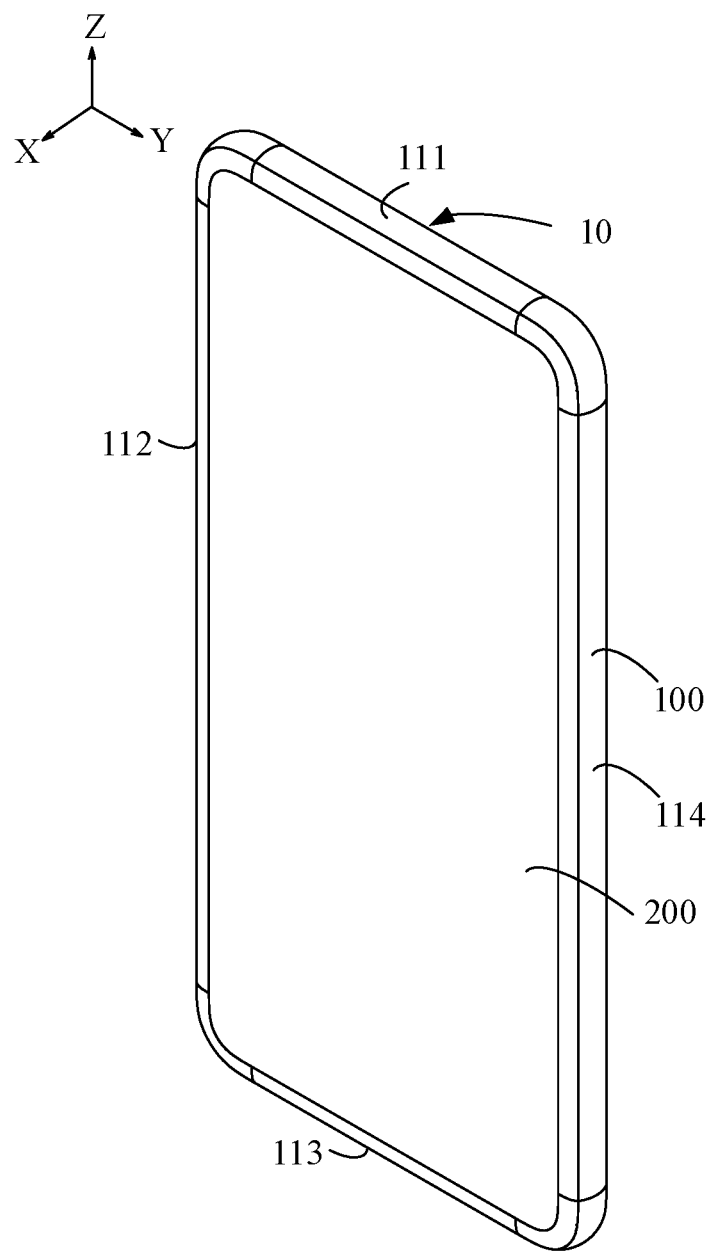
FIG. 1 is a perspective view of a mobile terminal according to an embodiment.
Figure 2:
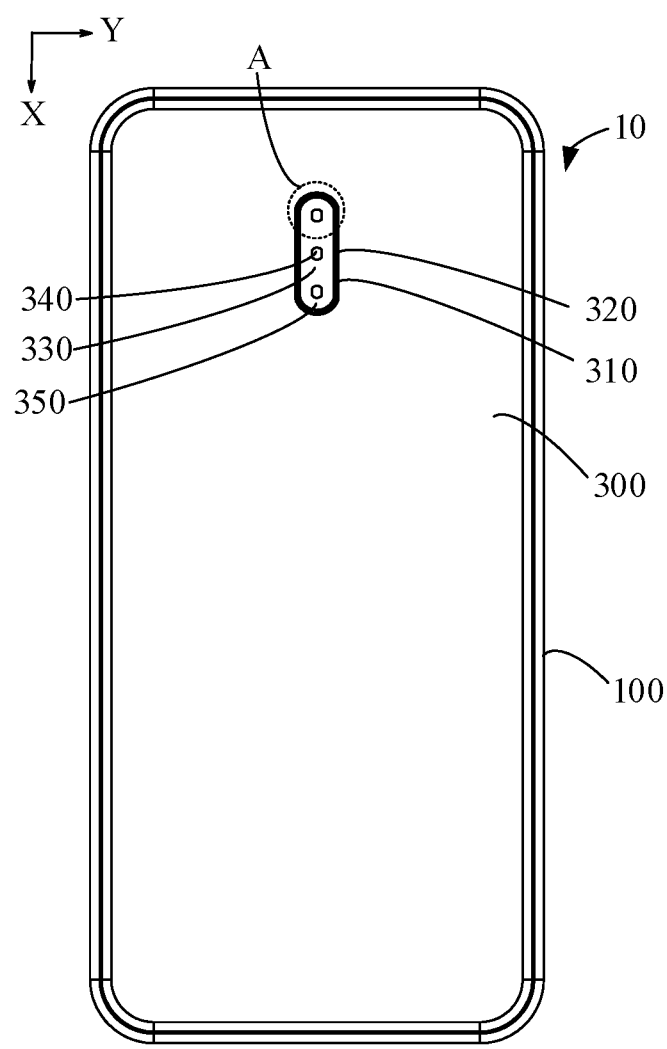
FIG. 2 is a rear view of the mobile terminal shown in FIG. 1 according to an embodiment.
Figure 3:
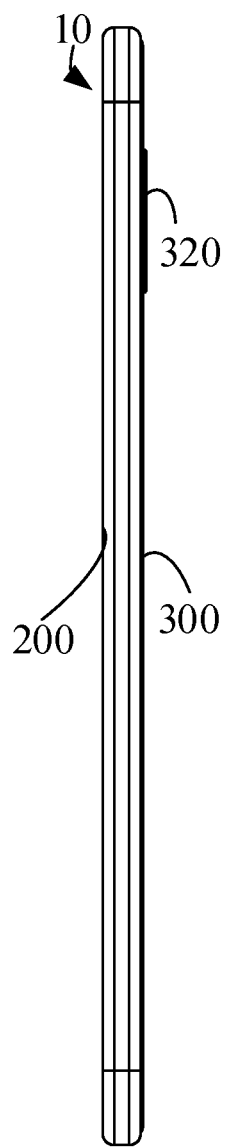
FIG. 3 is a side view of the mobile terminal shown in FIG. 2.

As shown in FIG. 1 to FIG. 3, in an embodiment, a mobile terminal 10 is provided. The mobile terminal 10 may be a smart phone, a computer, or a tablet. In the following description, for example, the mobile terminal 10 is a mobile phone. The mobile terminal 10 includes a display assembly 200, a middle frame 100, a battery cover 300, and a main board (not shown). The display screen assembly 200 and the battery cover 300 are respectively fixed on both sides of the middle frame 100. The display screen assembly 200, the middle housing frame 100 and the battery cover 300 together form an external structure of the mobile terminal 10. The main board is located inside the mobile terminal 10, and controllers, storage units, power management units, baseband chips and other electronic components can be incorporated on the main board.

The display screen assembly 200 can be used to display pictures or characters. The main board can control the operation of the mobile terminal 10. It should be understood that when a user normally uses the mobile terminal 10 to make and receive a call, the earpiece of the mobile terminal 10 faces the user's ear, the microphone of the mobile terminal 10 faces the user's mouth, and the mobile terminal 10 can be close to perpendicular to the ground. The end facing upward is the top end 111 of the mobile terminal 10, the end facing down is the bottom end 113 of the mobile terminal 10, the end facing left is the left end 112 of the mobile terminal 10, and the end facing right is the right end 114 of the mobile terminal 10. The distance between the left end 112 and the right end 114 defines the width of the mobile terminal 10. The width direction of the mobile terminal 10 is the Y direction. The distance between the top end 111 and the bottom end 113 defines the length of the mobile terminal 10. The length direction of the mobile terminal 10 is the Z direction. The distance between the outer surface of the display screen assembly 200 and the outer surface of the battery cover 300 defines the thickness of the mobile terminal 10, and the thickness direction of the mobile terminal 10 is the X direction.

In an embodiment, the display screen assembly 200 uses an LCD (Liquid Crystal Display) screen for displaying information. The LCD screen may be a TFT (Thin Film Transistor) screen or an IPS (In-Plane Switching) screen or a SLCD (Splice Liquid Crystal Display) screen. In another embodiment, the display module 200 uses an OLED (Organic Light-Emitting Diode) screen for displaying information. The OLED screen may be an AMOLED (Active Matrix Organic Light Emitting Diode) screen or a Super AMOLED (Super Active Matrix Organic Light Emitting Diode) screen or a Super AMOLED Plus (Super Active Matrix Organic Light Emitting Diode Plus) screen. Under the control of controllers, the display screen assembly 200 can display information and provide an operation interface for users.

Figure 5:
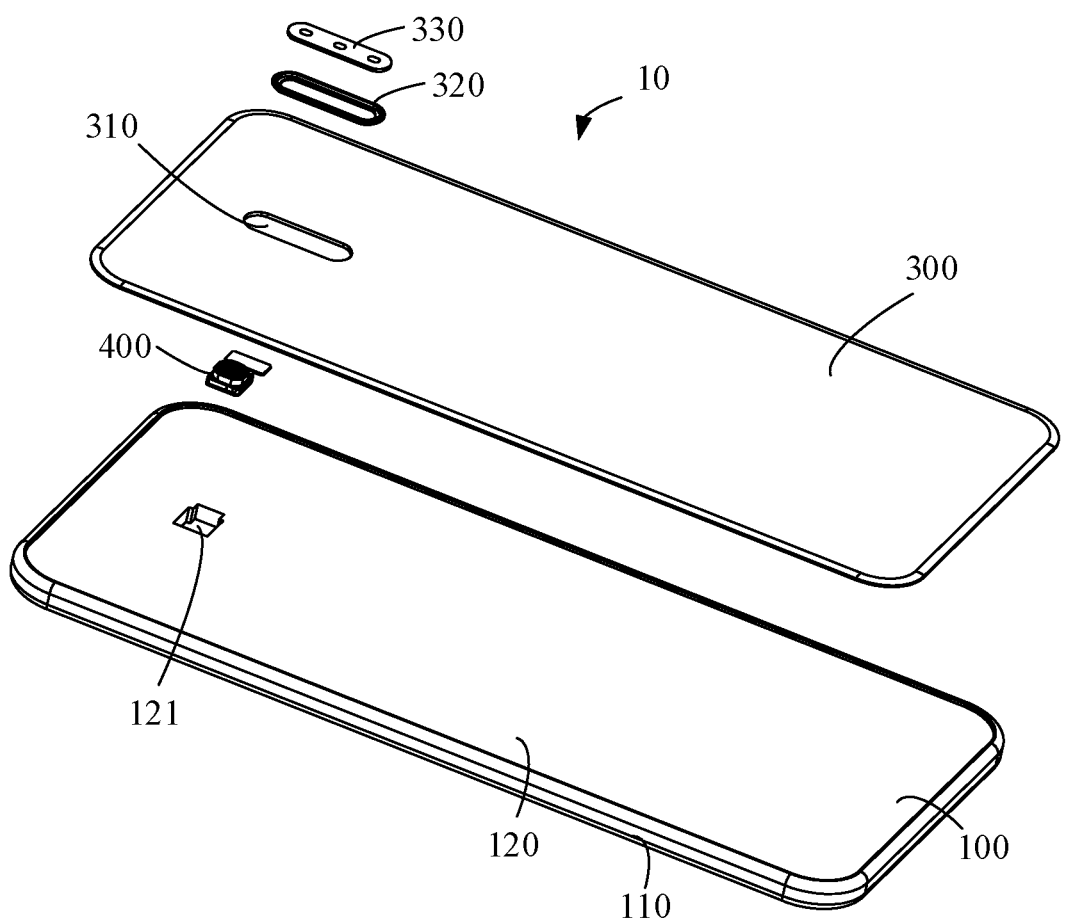
FIG. 5 is an exploded view of the mobile terminal shown in FIG. 1.

As shown in FIG. 5, in an embodiment, the middle frame 100 includes a bezel 110 and a middle plate 120. The bezel 110 surrounds the outer periphery of the middle plate 120 to form two installation spaces opposite to each other. The display screen assembly 200 is disposed in one of the installation spaces, and the other installation space is covered by the battery cover 300. A main board (not shown) can be fixed on a side of the middle board 120 facing the battery cover 300. A camera component 400 is provided in the mobile terminal 10. A mounting slot 121 can be defined in the middle plate 120, and the camera component 400 may be fixed in the mounting slot 121. The mobile terminal 10 can include a decorative ring 320 and a sheet 330. The battery cover 300 is provided with a through slot 310, the decorative ring 320 may pass through the through slot 310 and be fixed in the through slot 310. The sheet 330 can be fixed on the decorative ring 320, and the sheet 330 can cover the camera component 400. Ambient light from the outer surface of the battery cover 300 pass into the camera module 400 through the sheet 330, so that the camera module 400 can capture images or videos.

Figure 4:
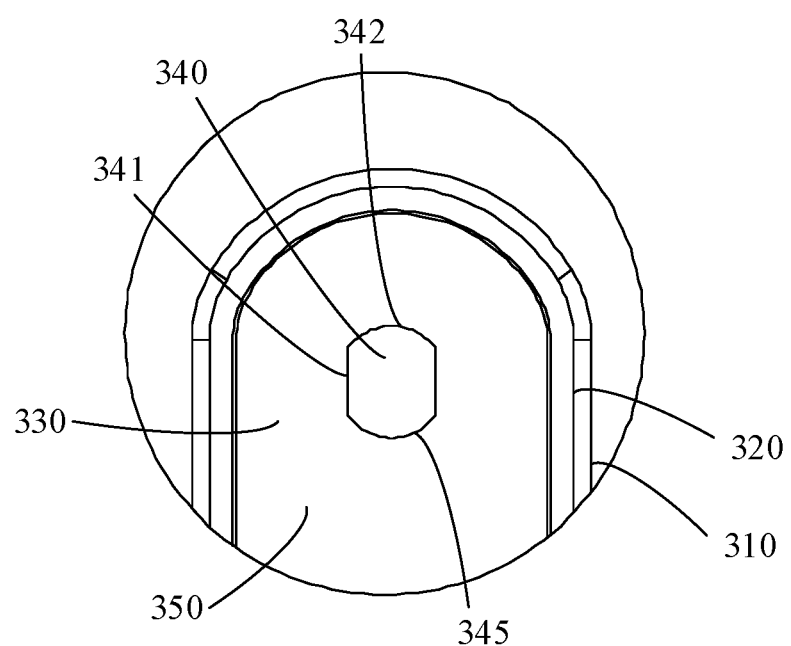
FIG. 4 is an enlarged view of the structure of the A part of the mobile terminal shown in FIG. 2 according to an embodiment.
Figure 6:
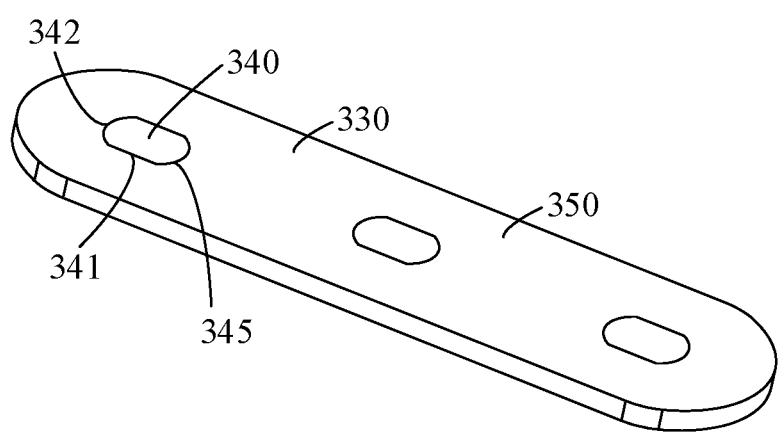
FIG. 6 is a perspective view of a sheet of the mobile terminal shown in FIG. 5.

As shown in FIGS. 4 and 6, in an embodiment of the present disclosure, the sheet 330 includes a light-transmitting region 340 and a light-shielding region 350. The light-shielding region 350 surrounds the light-transmitting region 340, and the light-transmitting region 340 includes edge contour lines 345. It should be understood that the edge contour lines 345 can be the boundary between the light-shielding region 350 and the light-transmitting region 340. The light transmittance of the light transmitting region 340 can be greater than or equal to 75%, and the light transmittance of the light shielding region 350 may be less than 75%. The edge contour lines 345 include first straight line segments 341 and first arc line segments 342. The number of the first straight line segments 341 is two, and the two first straight line segments 341 are opposite to each other. The number of the first arc line segments 342 is two, and the two first arc segments 342 are opposite to each other. It should be understood that the two first arc segments 342 are circular arcs and are located on the same circle. The first straight line segments 341 and the first arc line segments 342 are alternately connected, and the first straight line segments 341 are located in a circle where the first arc line segments 342 are located. It should be understood that, the region surrounded by the circle where the first arc line segments 342 are located is cut by the two first straight line segments 341, and the remaining region forms the light-transmitting region 340. The light-transmitting region 340 may not be a common square or circular region, but instead be a region where two opposite sides are straight lines and another two opposite sides are arcs. In this way, the light-transmitting region 340 may occupy less space and reduce the width of the decorative ring 320.

Figure 7:
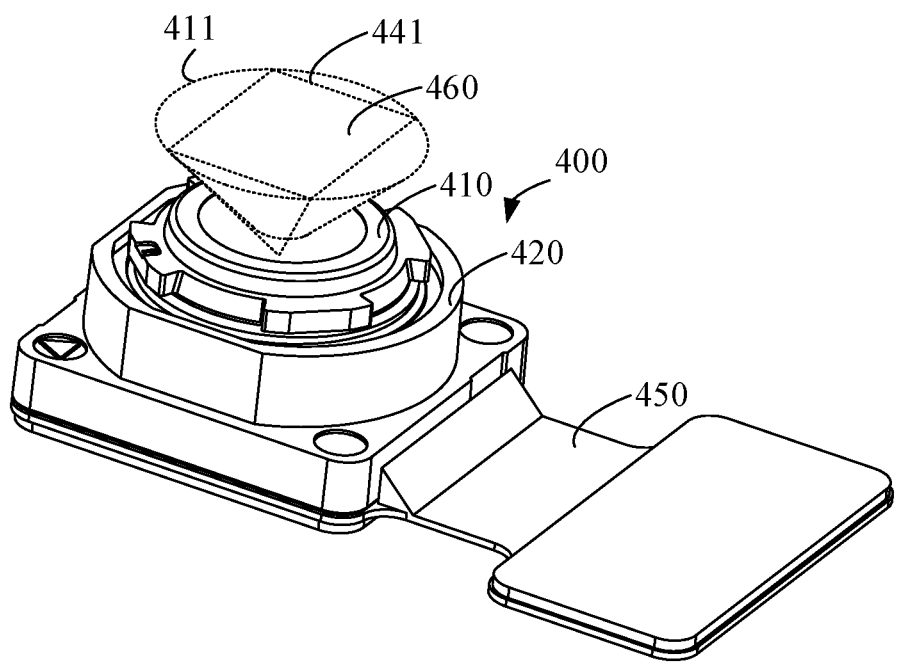
FIG. 7 is a perspective view of a camera component of the mobile terminal shown in FIG. 5.
Figure 8:
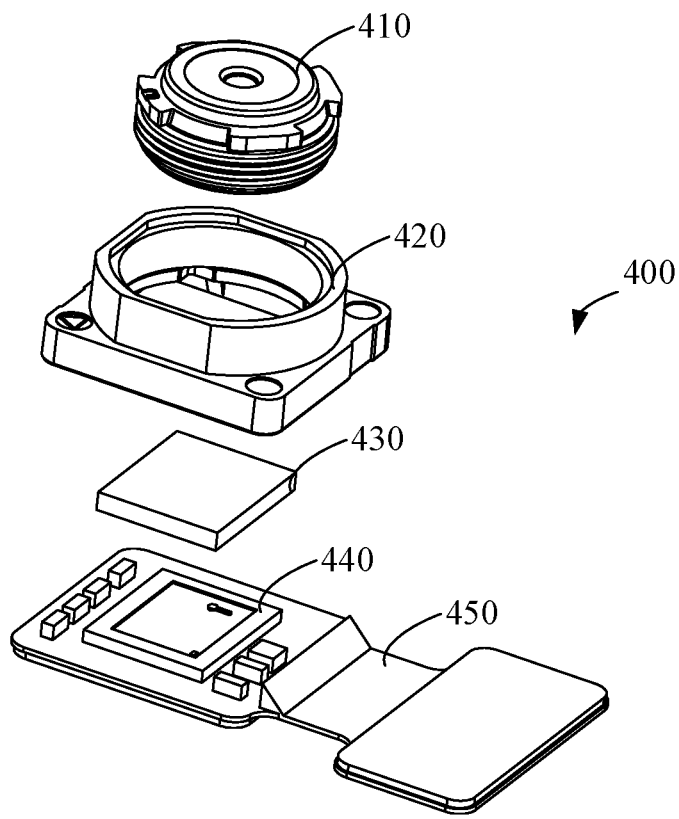
FIG. 8 is an exploded view of the camera component shown in FIG. 7.
Figure 9:
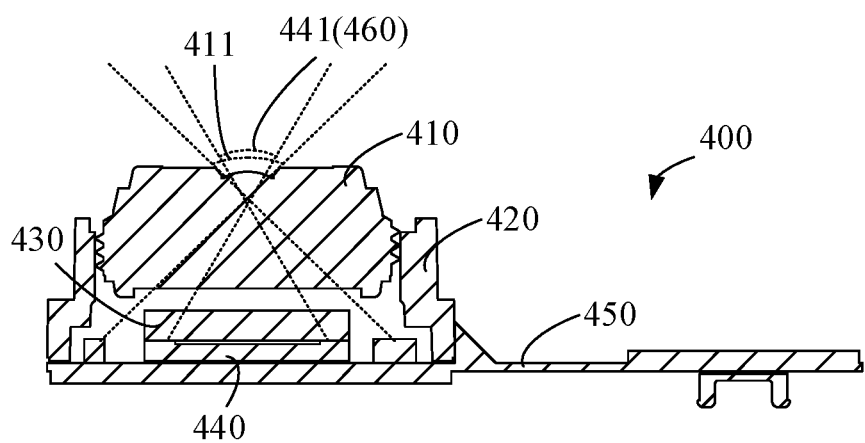
FIG. 9 is a cross-sectional view of the camera component shown in FIG. 7.

As shown in FIGS. 7 to 9, in an embodiment, the camera component 400 includes a lens 410, a base 420, a filter 430, a sensor 440, and a circuit board 450. The circuit board 450 can be fixed to one side of the base 420, and the sensor 440 can be fixed to a side of the circuit board 450 facing the base 420. The lens 410 can be fixed to the other side of the base 420, and the filter 430 can be fixed to the base 420 and located between the lens 410 and the sensor 440.

In the embodiment shown in FIGS. 7 and 9, the lens 410 has a circular viewing angle 411 of the camera component 400, the sensor 440 has a square viewing angle 441 of the camera component 400, and a region where the circular viewing angle 411 and the square viewing angle 441 overlap is an effective region which forms the field of view 460 of the camera component 400, that is, the field of view 460 is within the circular viewing angle 411. It should be understood that the portion of the circular viewing angle 411 outside the viewing angle 460 is outside the square viewing angle 441—the light in this portion may not be transmitted to the sensor 440 for use in imaging. The portion of the square viewing angle 441 outside the viewing angle 460 is outside the circular viewing angle 411—the light in this portion can be blocked by the lens 410 and may not pass to the inside of the lens 410. Although the portion is located within the square viewing angle 441, it may not be transmitted to the sensor 440 and may not be used for imaging due to the blocking of the lens 410.

Figure 10:
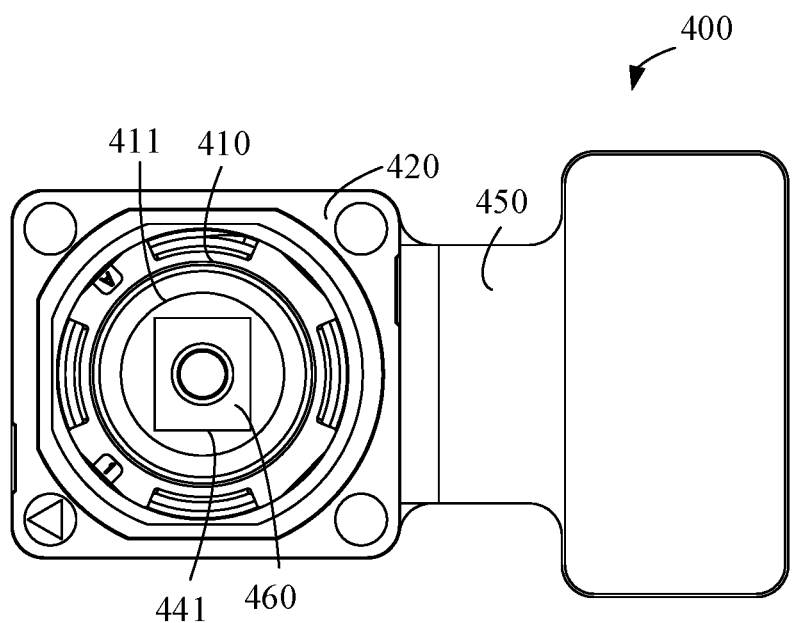
FIG. 10 is a plan view of the camera component shown in FIG. 7 according to an embodiment.
Figure 11:
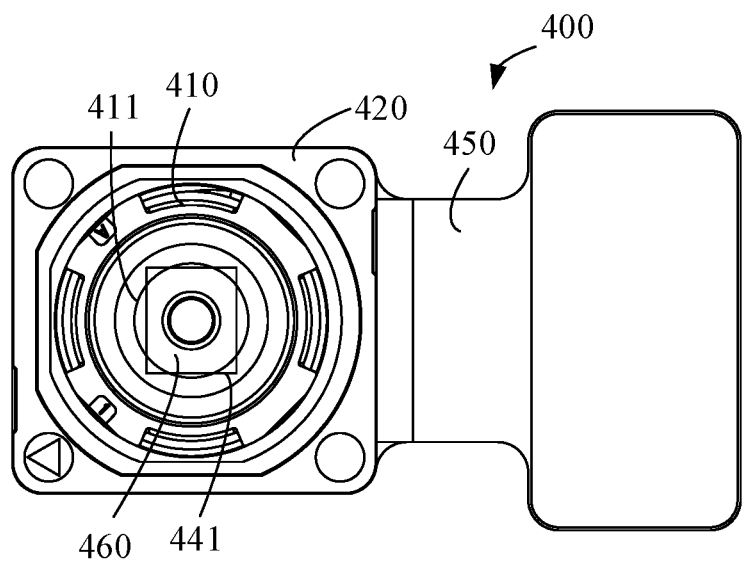
FIG. 11 is a top view of the camera component shown in FIG. 7 according to an embodiment.

In one embodiment, as shown in FIG. 7 and FIG. 10, the square viewing angle 441 may be completely within the circular viewing angle 411, and then the field of view 460 of the camera component 400 is a square viewing angle 441. In another embodiment, as shown in FIG. 11, the square viewing angle 441 and the circular viewing angle 411 partially overlap. The relationship between the positions of the circular viewing angle 411 and the square viewing angle 441 and the size of the regions may be designed according to actual need, and are not specifically limited here. The field of view 460 of the camera component 400 is a portion where the square viewing angle 441 and the circular viewing angle 411 overlap with each other.

The field of view 460 intersects with the outer surface of the sheet 330 to form intersections 480. The intersections 480 are located in the light-transmitting region 340, so that the ambient light in the field of view 460 from the outer surface side of the battery cover 300 can pass through the light-transmitting region 340 to the inside of the camera component 400. Ambient light can then be transmitted to the sensor 440 to form images. The ambient light within the field of view 460 is not blocked by the light-shielding region 350.

Figure 12:
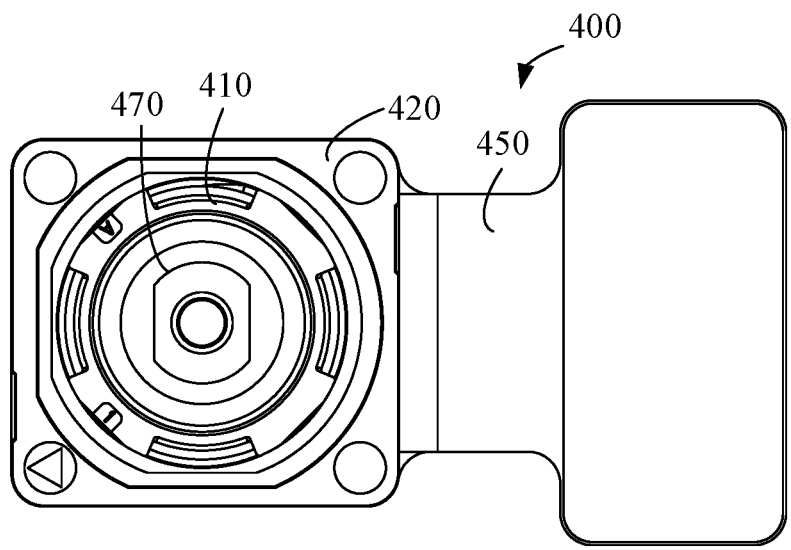
FIG. 12 is a top view of the camera component shown in FIG. 7 according to an embodiment.

As shown in FIG. 12, the light-transmitting region 340 may form a special-shaped viewing angle 470 on the camera component 400. The shape of the special-shaped viewing angle 470 can be the same as the shape formed by the edge contour lines 345, and the field of view 460 in FIG. 10 and the field of view in FIG. 11 are all located in the special-shaped viewing angle 470 in FIG. 12, so that the ambient light in the field of view 460 can pass through the light-transmitting region 340 and not be blocked.

In an embodiment, the first straight line segments 341 can be partially or entirely within the circular viewing angle 411. In other words, the first straight line segments 341 may be partially or entirely within the intersections where the circular viewing angle 411 and the outer surface of the sheet 330 intersect with each other. The region surrounded by the intersections where the circular viewing angle 411 and the outer surface of the sheet 330 intersect with each other is cut is cut by two first straight line segments 341, so that the area of the light-transmitting region 340 is smaller than that of the traditional circular light-transmitting region. Accordingly, the light-transmitting region 340 may occupy less space, which can advantageously reduce the width of the decorative ring 320.

As shown in FIG. 7 and FIG. 10, in an embodiment, the square viewing angle 441 is in the region of the circular viewing angle 411. The square viewing angle 441 may or may not intersect the circular viewing angle 411, and embodiments of the present disclosure do not impose specific limitations on this. In this embodiment, the field of view 460 of the camera component 400 is the square viewing angle 441. The intersections 480 include two second straight line segments 481 and two third straight line segments 482, two second straight line segments 481 are oppositely arranged, two third straight line segments 482 are oppositely arranged, and the second straight line segments 481 and the third straight line segments 482 are arranged adjacently and connected end to end to form a square structure.

Figure 13:
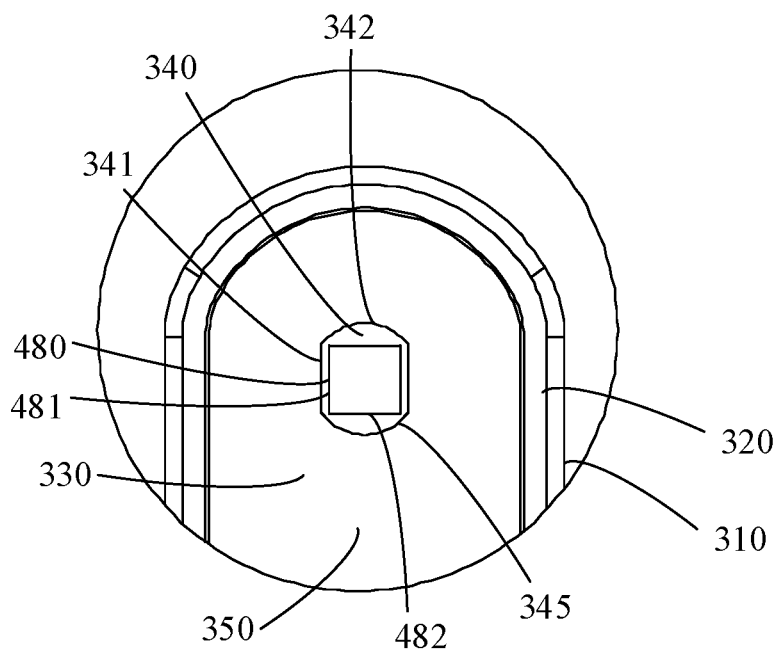
FIG. 13 is an enlarged view of the structure of the part A of the mobile terminal shown in FIG. 2 according to an embodiment.

As shown in FIG. 13, in an embodiment, the intersections 480 can be located inside the region surrounded by the edge contour lines 345, that is, the intersections 480 are located in the light-transmitting region 340. The second straight line segments 481 and the first straight line segments 341 are parallel, the third straight line segments 482 does not extend beyond the edge contour lines 345. The circle formed by the circular viewing angle 411 on the outer surface of the sheet 330 may be located between the circle where the first arc segments 342 are located and the intersections 480. A portion of the first straight segments 341 can be located within the circular viewing angle 411. A portion of the circular viewing angle 411 can be within the light-transmitting region 340, and the remaining portion of the circular viewing angle 411 can be outside the light-transmitting region 340 because the remaining portion is cut off by a part of the first straight line segments 341. The size of the light-transmitting region 340 in the width direction of the mobile terminal 10, that is, the size in the Y direction can be smaller than the diameter of the circular viewing angle 411 at the outer surface of the sheet 330. This can beneficially reduce the size of the light-transmitting region 340 in the width direction of the mobile terminal 10, that is, the size in the Y direction. Accordingly, the size of the decorative ring 320 and the size of the sheet 330 can be reduced.

Figure 14:
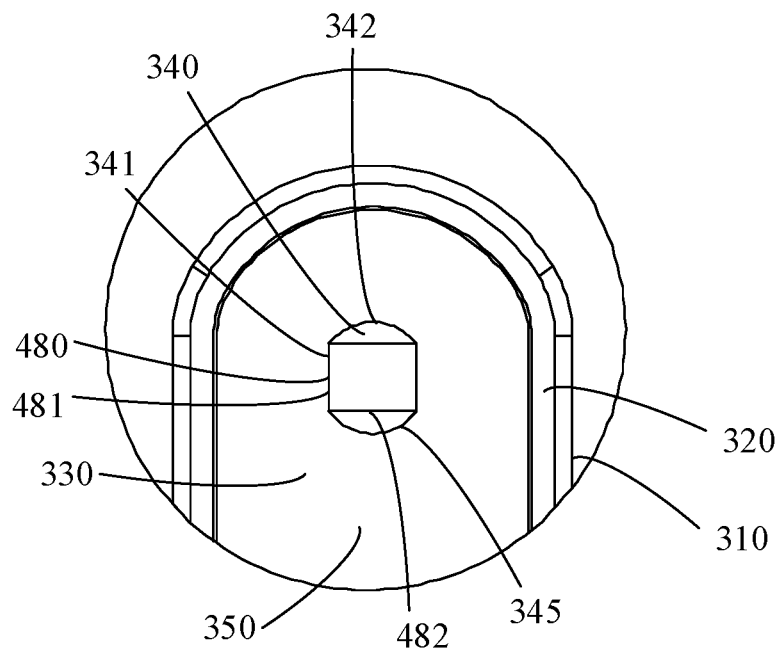
FIG. 14 is an enlarged view of the structure of the part A of the mobile terminal shown in FIG. 2 according to an embodiment.

FIG. 14 depicts another embodiment where intersections 480 can be located in the region surrounded by the edge contour lines 345. That is, the intersections 480 can be located in the light-transmitting region 340. The second straight line segments 481 and the first straight line segments 341 overlap with each other, and the third straight line segments 482 do not extend beyond the edge contour lines 345. The circular viewing angle 411 overlaps with the circle where the first arc line segments 342 are located on the outer surface of the sheet 330. The first straight line segments 341 may all be located in the circular viewing angle 411. A part of the circular viewing angle 411 can be located in the light-transmitting region 340, and a remaining portion of the circular viewing angle 411 be located outside the light-transmitting region 340 because the remaining portion is cut off by the first straight line segments 341. The size of the light-transmitting region 340 in the width direction of the mobile terminal 10, that is, the size in the Y direction can be smaller than the diameter of the circular viewing angle 411 at the outer surface of the sheet 330. Accordingly, the size of the light-transmitting region 340 in the width direction of the mobile terminal 10, that is, the size of the light-transmitting region 340 in the Y direction can be reduced, which can callow the size of the decorative ring 320 and the size of the sheet 330 to be reduced.

As shown in FIG. 11, in an embodiment, the square viewing angle 441 and the circular viewing angle 411 partially overlap. With reference back to FIG. 14, the intersections where the viewing angle 460 of the camera component 400 and the outer surface of the sheet 330 intersect with each other form a square structure with four corners being curved. The intersections 480 include two second straight line segments 481, two third straight line segments 482, and four second arc line segments 483. Two second straight line segments 481 are arranged opposite one another, and the two third straight line segments 482 are arranged opposite one another. Each of the second arc segments 483 is connected between one of second straight line segments 481 and one of the third straight line segments 482, which are adjacent one another, and the four second arc segments 483 are located on the same circle.

Figure 15:
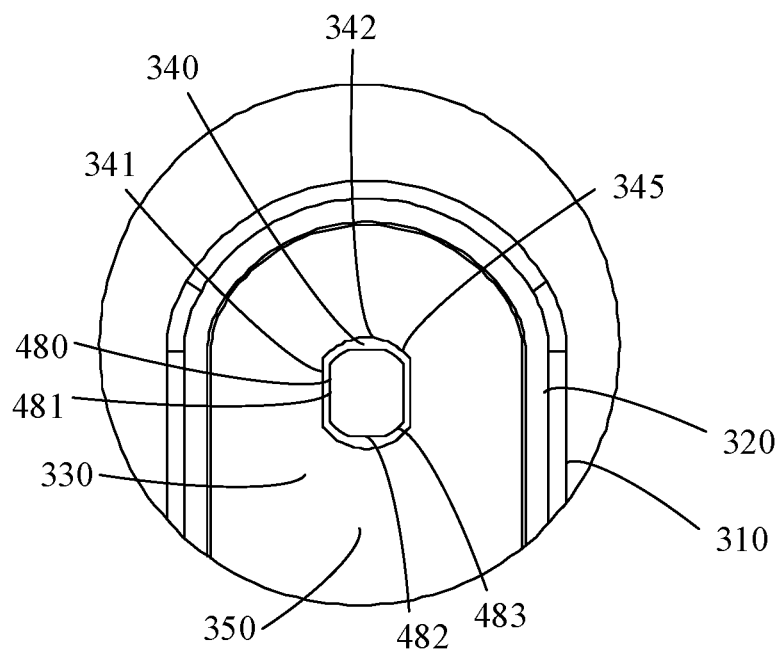
FIG. 15 is an enlarged view of the structure of the part A of the mobile terminal shown in FIG. 2 according to an embodiment.

In an embodiment shown in FIG. 15, intersections 480 are located inside the region surrounded by the edge contour lines 345, that is, the intersections 480 are located in the light-transmitting region 340. The second straight line segments 481 and the first straight line segments 341 are parallel, the second arc segments 483 and the first arc segments 342 are parallel, and the third straight line segments 482 do not extend beyond the edge contour lines 345. The circular viewing angle 411 overlaps with the circle where the second arc segments 483 are located on the outer surface of the sheet 330. A portion of the first straight segments 341 can be located in the circular viewing angle 411. A portion of the circular viewing angle 411 may be located in the light-transmitting region 340 and a remaining portion may be outside the light-transmitting region 340 because the remaining portion is cut off by the first straight line segments 341. The size of the light-transmitting region 340 in the width direction of the mobile terminal 10, that is, size of the light-transmitting region 340 in the Y direction can be smaller than the diameter of the circular viewing angle 411 at the outer surface of the sheet 330, which can beneficially reduce the size of the light-transmitting region 340 in the width direction of the mobile terminal 10, that is, size of the light-transmitting region 340 in the Y direction. Accordingly, the size of the decorative ring 320 and the size of the sheet 330 can be reduced.

Figure 16:
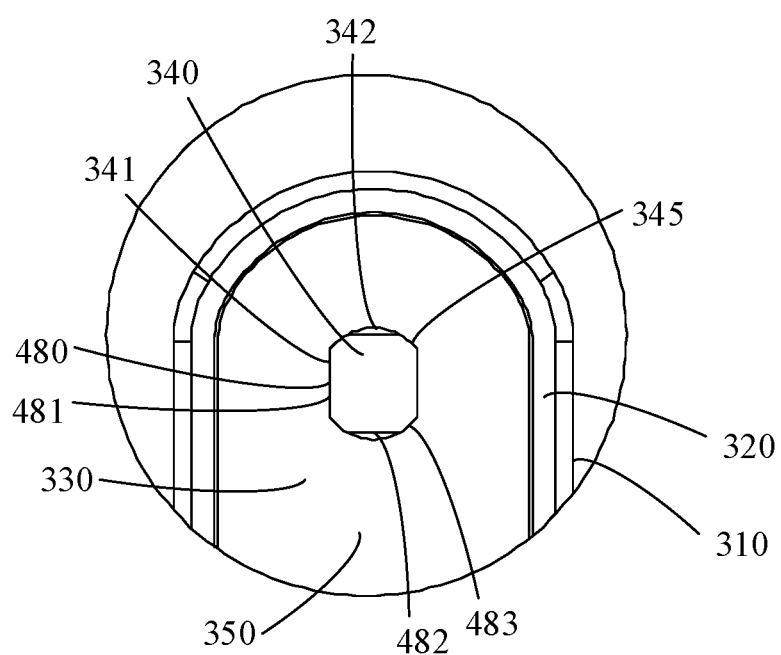
FIG. 16 is an enlarged view of the structure of the part A of the mobile terminal shown in FIG. 2 according to an embodiment.

FIG. 16 illustrates another embodiment where the second straight line segments 481 overlap with the first straight line segments 341, the second arc segments 483 overlap with the first arc segments 342, and the ends of the third straight segments 482 intersect with the first arc segments 342 and do not extend beyond the first arc segments 342. The circular viewing angle 411 overlaps with the circle where the first arc line segments 342 are located on the outer surface of the sheet 330. The first straight line segments 341 can all be within the circular viewing angle 411. A part of the circular viewing angle 411 can be within the light-transmitting region 340, and a remaining part can be outside the light-transmitting region 340 because the remaining part is cut off by a part of the first straight line segments 341. The size of the light-transmitting region 340 in the width direction of the mobile terminal 10, that is, the size of the light-transmitting region 340 in the Y direction can be smaller than the diameter of the circular viewing angle 411 on the outer surface of the sheet 330. Accordingly, the size of the light-transmitting region 340 in the width direction of the mobile terminal 10, that is, the size of the light-transmitting region 340 in the Y direction may be reduced, thereby reducing the size of the decorative ring 320 and the size of the sheet 330.

As shown in FIGS. 2 and 3, in an embodiment, the number of camera components 400 is n, and n is greater than or equal to 1. As shown in FIG. 2, n is 3, and the three camera components 400 are along the length direction of the mobile terminal 10, i.e., the Z direction. The first straight line segments 341 are arranged along the length direction of the mobile terminal 10, that is, the Z direction. Compared with the circular light-transmitting region, the light-transmitting region 340 in this embodiment occupies less space in the width direction, that is, the Y direction, so that the width of the decorative ring 320 can be reduced. Under the premise of being compatible with intersecting effective regions, the light-transmitting region 340 can also be designed with more shapes. In another embodiment, the n camera assemblies 400 are arranged along the width direction of the mobile terminal 10, that is, the Y direction, and the first straight line segments 341 are arranged along the width direction of the mobile terminal 10, that is, the Y direction.

Figure 17:
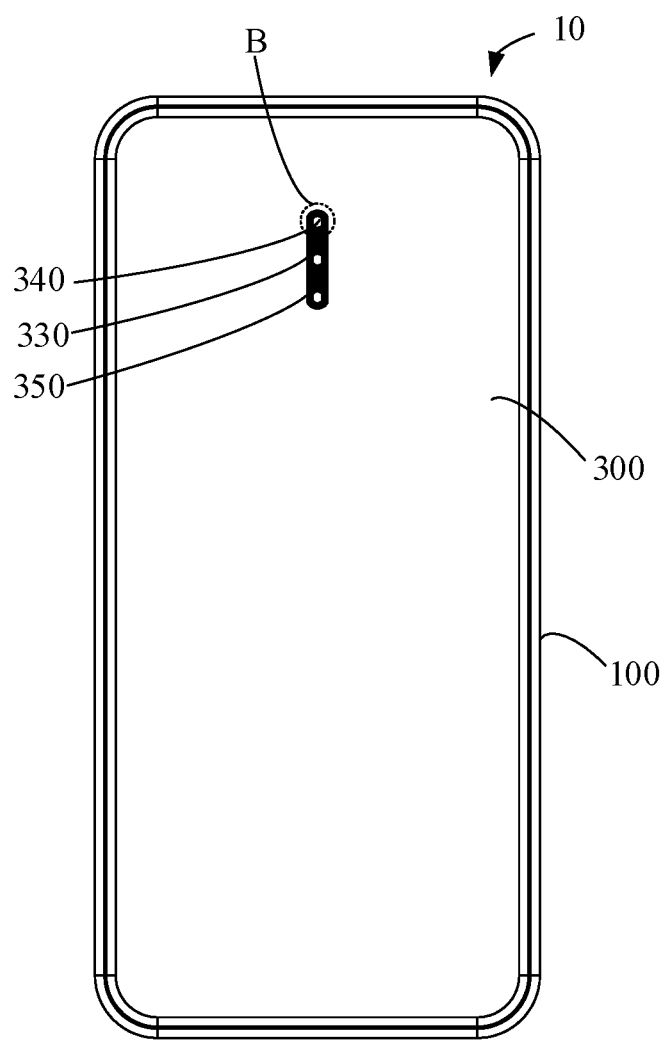
FIG. 17 is a rear view of the mobile terminal shown in FIG. 1 according to an embodiment.
Figure 18:
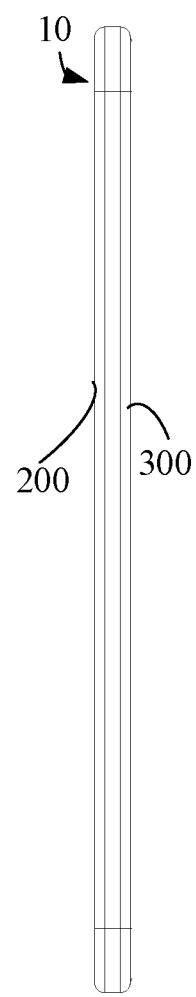
FIG. 18 is a side view of the mobile terminal shown in FIG. 17.
Figure 19:
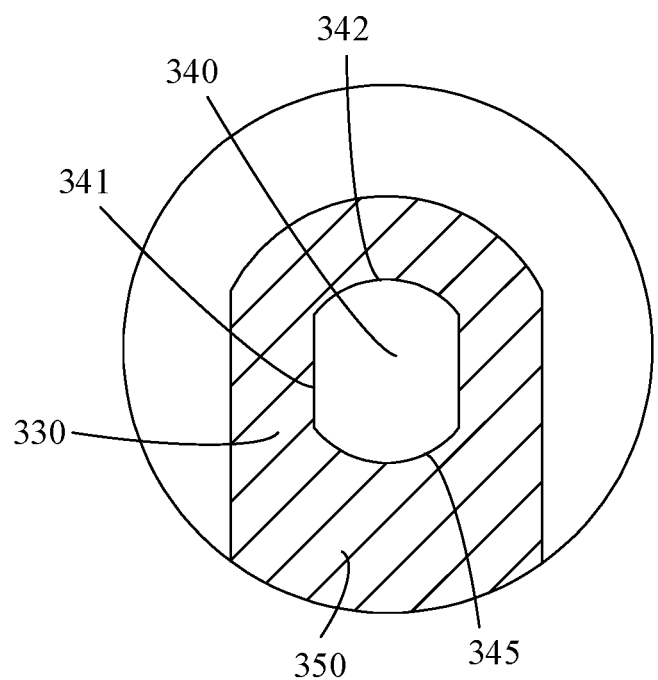
FIG. 19 is an enlarged view of the part B of the mobile terminal shown in FIG. 17.

As shown in FIG. 17 to FIG. 19, in an embodiment, a part of the battery cover 300 is transparent, and this region can be form a sheet 330 including a light-transmitting region 340 and a light-shielding region 350. The step for providing the through slot 310 on the battery cover 300 can be omitted. The edge contour lines 345 of the light-transmitting region 340 in this embodiment are the same as the edge contour lines 345 described in the above embodiments.

In the mobile terminal 10 of the present disclosure, the edge contour lines 345 of the light-transmitting region 340 of the sheet 330 may not form a traditional circle or square shape, but instead form a shape that is a combination of a circle and a square. Specifically, the shape can be defined by edge contour lines 345 including first straight segments 341 and first arc segments 342. The first straight line segments 341 can be partially or entirely located within the circular viewing angle 411, and the ambient light within the field of view 460 of the camera component 400 can enter the camera component 400 through the light-transmitting region 340. The area of the light-transmitting region 340 may be reduced while the light-transmitting region can meet the field of view 460 of the camera component 400, and the size of the decorative ring 320 and the size of the sheet 330 as well as the through slot 310 can be reduced. As a result, the strength of the battery cover 300 can be increased, and the physical form of the mobile terminal 10 can be changed to improve aesthetics of the product.

The technical features of the embodiments described above can be arbitrarily combined. In order to simplify the description, all possible combinations of the technical features in the above embodiments have not been described. However, as long as there is no contradiction in the combination of these technical features, such combination should be considered as falling within the scope of the present disclosure.

The above-mentioned embodiments provide specific and detailed implementation manners of the present disclosure, but they should not be understood as limiting the scope of present disclosure. It should be noted that, for those of ordinary skill in the art, without departing from the concept of the present disclosure, modifications and improvements can be made, which all fall within the protection scope of the present disclosure. Therefore, the scope of the present disclosure is defined by the appended claims.

What is claimed is:

1. A mobile terminal, comprising:
one or more camera components located inside the mobile terminal, each of the one or more camera components comprising a lens having a circular viewing angle, and each of the camera one or more camera components having a field of view, and the field of view being within the circular viewing angle; and
a sheet that covers the one or more camera components, the sheet comprising a light-transmitting region and a light-shielding region, the light-shielding region surrounding the light-transmitting region, and the field of view intersecting with the sheet to form intersections located in the light-transmitting region;
wherein the light-transmitting region comprises edge contour lines comprising first straight line segments and first arc line segments connected to each other, the first straight line segments being located in a circle in which the first arc line segments are located, and the first straight line segments being at least partially located within the circular viewing angle;
wherein the one or more camera components comprise a sensor that has a square viewing angle, and a portion where the circular viewing angle and the square viewing angle overlap forms the field of view;
wherein there are two of the first straight line segments, and the two first straight line segments are arranged opposite one another;
wherein there are two of the first arc line segments, and the two first arc segments are arranged opposite one another;
wherein ends of each of the first straight segments are directly connected to ends of the first arc segments such that the first straight segments and the first arc segments are alternately connected to one another;
wherein the intersections form a square structure with four corners being curved, and the intersections comprise two second straight line segments, two third straight line segments, and four second arc segments;
wherein the two second straight line segments are arranged opposite one another, the two third straight line segments are arranged opposite one another, and each of the second arc segments is connected between one of second straight line segments and one of the third straight line segments which are adjacent to one another;
wherein the second straight line segments overlap with the first straight line segments, and the second arc segments overlap with the first arc segments.

2. The mobile terminal according to claim 1, wherein the one or more camera components includes n camera components, n being greater than or equal to 1;
wherein one of the following:
the n camera components are arranged along a length direction of the mobile terminal, and the first straight line segments are provided along the length direction of the mobile terminal; and
the n camera components are arranged along the width direction of the mobile terminal, and the first straight line segments are provided along the width direction of the mobile terminal.

3. The mobile terminal according to claim 1, further comprising a battery cover and a decorative ring, wherein a through slot is formed on the battery cover, and the decorative ring passes through the through slot and is fixed in the through slot, and the sheet is fixed to the decorative ring.

4. The mobile terminal according to claim 1, further comprising a battery cover, wherein a part of the battery cover forms the sheet.

5. A mobile terminal, comprising:
one or more camera components located inside the mobile terminal, each of the camera components comprising a lens and a sensor, the lens having a circular viewing angle, the sensor having a square viewing angle, and at least part of the square viewing angle is within the circular viewing angle; and
a sheet covering the one or more camera components, wherein the sheet comprises a light-transmitting region and a light-shielding region, the light-shielding region surrounding the light-transmitting region;
wherein the light-transmitting region comprises edge contour lines comprising first straight line segments and first arc line segments connected to each other, the first straight line segments being located in a circle in which the first arc line segments are located, the square viewing angle being entirely within the light-transmitting region, a part of the circular viewing angle being within the light-transmitting region, and another part of the circular viewing angle being outside the light-transmitting region;
wherein a portion where the circular viewing angle and the square viewing angle overlap forms a field of view of the one or more camera components, and the field of view intersects with the sheet to form intersections located in the light-transmitting region;
wherein there are two of the first straight line segments, and the two first straight line segments are arranged opposite one another;
wherein there are two of the first arc line segments, and the two first arc segments are arranged opposite one another;
wherein ends of each of the first straight segments are directly connected to ends of the first arc segments such that the first straight segments and the first arc segments are alternately connected to one another;
wherein the intersections form a square structure with four corners being curved, and the intersections comprise two second straight line segments, two third straight line segments, and four second arc segments;
wherein the two second straight line segments are arranged opposite one another, the two third straight line segments are arranged opposite one another, and each of the second arc segments is connected between one of second straight line segments and one of the third straight line segments which are adjacent to one another;
wherein the second straight line segments overlap with the first straight line segments, and the second arc segments overlap with the first arc segments.

* * * * *